United States Patent
Barnes et al.

(10) Patent No.: US 6,754,187 B1
(45) Date of Patent: Jun. 22, 2004

(54) PERFORMANCE ENHANCEMENT SYSTEM FOR DIGITAL PBX

(75) Inventors: Brady Barnes, Chandler, AZ (US); Lloyd Tarr, Fountain Hills, AZ (US); Curtis J. Behun, Phoenix, AZ (US)

(73) Assignee: Inter-Tel, Inc., Tempe, AZ (US)

( * ) Notice: Subject to any disclaimer, the term of this patent is extended or adjusted under 35 U.S.C. 154(b) by 0 days.

(21) Appl. No.: 09/543,518

(22) Filed: Apr. 6, 2000

(51) Int. Cl.$^7$ ................................................ H04B 1/38
(52) U.S. Cl. .................... 370/286; 370/290; 375/222
(58) Field of Search ................ 379/406.01, 406.02, 379/406.08, 406.06, 406.07, 392.01, 345, 198, 402, 387.01; 370/286, 290; 375/222

(56) References Cited

U.S. PATENT DOCUMENTS

| | | | |
|---|---|---|---|
| 4,731,834 A | * 3/1988 | Duttweiler et al. | .... 379/406.01 |
| 4,755,984 A | 7/1988 | Ambrosio et al. | |
| 4,796,296 A | 1/1989 | Amada et al. | |
| 4,799,214 A | 1/1989 | Kaku | |
| 4,835,791 A | * 5/1989 | Daoud | ........................ 370/286 |
| 4,924,480 A | * 5/1990 | Gay et al. | .................... 370/286 |
| 4,977,591 A | 12/1990 | Chen et al. | |
| 4,995,030 A | 2/1991 | Helf | |
| 5,029,204 A | 7/1991 | Shenoi et al. | |
| 5,222,084 A | 6/1993 | Takahashi | |
| 5,388,092 A | 2/1995 | Koyama et al. | |
| 5,528,679 A | 6/1996 | Taarud | |
| 5,577,027 A | 11/1996 | Cheng | |
| 5,579,305 A | 11/1996 | Norrell | |
| 5,590,121 A | 12/1996 | Geigel et al. | |
| 5,598,401 A | 1/1997 | Blackwell et al. | |
| 5,625,646 A | 4/1997 | Goodson et al. | |
| 5,644,594 A | 7/1997 | Johnson et al. | |
| 5,671,251 A | 9/1997 | Blackwell et al. | |
| 5,680,451 A | 10/1997 | Betts et al. | |
| 5,682,378 A | 10/1997 | Betts et al. | |
| 5,682,386 A | 10/1997 | Arimilli et al. | |
| 5,724,393 A | 3/1998 | Dagdeviren | |
| 5,784,405 A | 7/1998 | Betts et al. | |
| 5,790,632 A | * 8/1998 | Antonio et al. | ................. 379/3 |
| 5,790,658 A | 8/1998 | Yip | |
| 5,793,809 A | 8/1998 | Holmquist | |
| 5,796,820 A | 8/1998 | Sasada | |
| 5,799,078 A | 8/1998 | Maurer | |
| 5,825,754 A | 10/1998 | Williams | |
| 5,831,561 A | 11/1998 | Cai et al. | |
| 5,875,233 A | 2/1999 | Cox | |
| 5,887,059 A | 3/1999 | Xie | |
| 5,892,757 A | 4/1999 | Norrell | |
| 5,896,420 A | 4/1999 | Kaku et al. | |
| 5,909,426 A | 6/1999 | Liau et al. | |
| 6,081,593 A | * 6/2000 | Kim | ........................... 379/410 |
| 6,151,364 A | * 11/2000 | Ruether et al. | ............. 375/254 |
| 6,516,062 B1 | * 2/2003 | Yang et al. | ............ 379/406.08 |
| 6,597,732 B1 | * 7/2003 | Dowling | ..................... 375/222 |

OTHER PUBLICATIONS

Warke & Ali, Optimum Codec Companding for High–Speed PCM Data Transmission in Telephone Networks, journal, 3/99, 2679–82, vol. 5, IEEE.

* cited by examiner

*Primary Examiner*—Rexford Barnie
(74) *Attorney, Agent, or Firm*—Michelle Whittington

(57) ABSTRACT

A system for ensuring optimum performance of a modem used in conjunction with a telephone system employing a digital PBX coupled with a two-wire analog trunk includes an echo cancellation circuit having an adaptive filter connected in series circuit with a linear codec between the digital PBX and a two-to-four wire hybrid converter coupled with the two-wire analog telephone trunk. The combination of the echo canceller and the linear codec allows accurate decoding of weak far end modem signals when such signals are summed with a strong near end modem signal echo. The DSP echo canceller removes the very strong near end modem echo and passes the far end modem signal with little distortion, while the linear codec permits accurate recovery of the weak far end signal in the presence of high noise levels.

10 Claims, 4 Drawing Sheets

PERFORMANCE ENHANCEMENT SYSTEM FOR DIGITAL PBX

BACKGROUND

Key systems and private branch exchanges (PBXs) are widely used telephone systems employed, primarily, with small and medium size businesses. PBX systems used in such businesses include both analog and digital PBX systems connected to two-wire analog trunks to connect their PBX or key system to the local phone company. Telephone lines which are used for residential purposes also typically are two-wire analog lines. Larger businesses, requiring many trunks, usually use systems known as T-1 digital trunks, because T-1 trunks provide the equivalent number of voice channels as twenty-four individual analog trunks.

The widespread use of personal computers (PCs) has resulted in the interconnection of such computers through modems which convert the digital signals from the computer to analog signals suitable for transmission over analog telephone lines, and for reconverting received analog signals into digital signals for processing by the computer. Early modems operated at relatively low speeds (below 28.8 kbps); and when such modems were connected between a personal computer and a digital or analog PBX, the modems operated at capacity equally as well with either type of PBX.

The introduction of high speed modems, currently operating at 28.8 kbps and 33.6 kbps, revealed a problem in conjunction with both digital key systems and digital PBXs. The problem manifested in unexpected operation of the modems below their capability. For example, when a user placed a high speed modem call through a digital PBX connected with a local two-wire analog telephone line, the operating speed of the modem dropped significantly. With a 28.8 or a 33.6 kbps modem, slower speeds (as low as 21.6 kbps or 19.2 kbps, or even lower) resulted. When the same modem was used in conjunction with a modem call directly without passing through a digital PBX, the full operating speed of the modem was realized. The slowdown only occurred with a system involving a digital PBX used in the loop.

Much higher speed modems, currently 56 kbps are in use; and such modems are not identified with the problem noted above. The reason is that 56 kbps modems require digital trunks, such as the T-1 trunk mentioned above or ISDN between the phone company and the digital PBX in order to achieve speeds greater than 33.6 kbps. The problem only arises when the digital PBX is coupled with a two-wire analog telephone line of the type commonly used throughout the United States and other countries.

From the foregoing, it was apparent that the digital PBX somehow adversely affected the modem speed under some operating conditions. The cause of the problem, however, was not at all apparent, and often has been accepted as some idiosyncracy that sometimes (but not always) affects the modem operation with systems employing digital PBXs.

After considerable analysis, it has been found that a combination of multiple conditions are required to cause the modem slowdown mentioned above. Even though a combination of all of these conditions was found necessary to create the problem, the combination occurred frequently enough that the problem has been relatively widespread. The conditions which were found to create the problem include, first of all, the connection of a high speed modem behind a digital PBX (not an analog PBX). The digital PBX then is connected to a local public switched telephone network (PSTN) using two-wire analog trunks. There is no problem when T-1 digital trunks are employed. Next, the two-wire analog trunk interface with the PBX uses industry standard companding non-linear codecs (e.g. $\mu$-law or A-law) for making the necessary analog-to-digital conversions. In addition, the trunk interface for the PBX also uses industry standard analog hybrid circuits to perform the two-wire to four-wire audio conversion (and back again).

Another factor for creating the problem noted above is that the two-wire analog trunk to the local PSTN was unusually long, resulting in greater than normal loss to the audio level (typically, 8 to 9 dB of loss). Finally, for the slowdown of the modem to take place, the user needed to make a high speed modem call through the digital PBX via the unusually long two-wire analog trunk going to the PSTN with all of the other conditions mentioned above being present. With so many requirements needed to work together to cause the problem, it would seem that the problem would occur infrequently. Unfortunately, for many digital key systems and PBX users, this has not been the case; and the problem mentioned here is in fact quite common and very annoying. Two-wire analog trunks are still common, especially among smaller businesses that do not require the bandwidth of a digital T-1 trunk. In addition, a fair percentage of the two-wire analog trunks are longer than what is considered "normal", causing significant audio loss in the line. When this is coupled together with the specific system components involving the digital PBX mentioned above, the modem slowdown occurs.

It is desirable to provide a system using a digital PBX in conjunction with a two-wire analog telephone trunk, which permits full utilization of high speed modems in conjunction with such a system.

SUMMARY OF THE INVENTION

It is an object of this invention to provide an improved digital PBX operating system.

It is another object of this invention to improve the operating characteristics of a digital PBX used in conjunction with a high speed modem.

It is an additional object of this invention to provide an improved system for a digital PBX interfacing with a two-wire analog telephone trunk.

It is yet another object of this invention to provide an improvement in signal-to-noise (S/N) and trans-hybrid loss (THL) which results in improved audio allowing for more 2-wire analog trunk parties in a conference before "singing" or "squealing" occurs.

It is a further object of this invention to include a linear codec and a DSP-based echo cancellation circuit in conjunction with a digital PBX coupled with a two-wire analog telephone trunk for enhancing the operating performance of high speed modems used with the PBX.

In accordance with a preferred embodiment of this invention, a system is provided for ensuring optimum performance of a digital modem used in conjunction with a telephone system employing a digital PBX coupled with a two-wire analog trunk. This is accomplished by providing a linear codec and a DSP-based echo cancellation adaptive filter connected in series circuit between the digital PBX and the hybrid circuit which converts two-wire analog signals on the telephone trunk to four-wire signals for the PBX, and vice versa.

DETAILED DESCRIPTION

Figure 1:
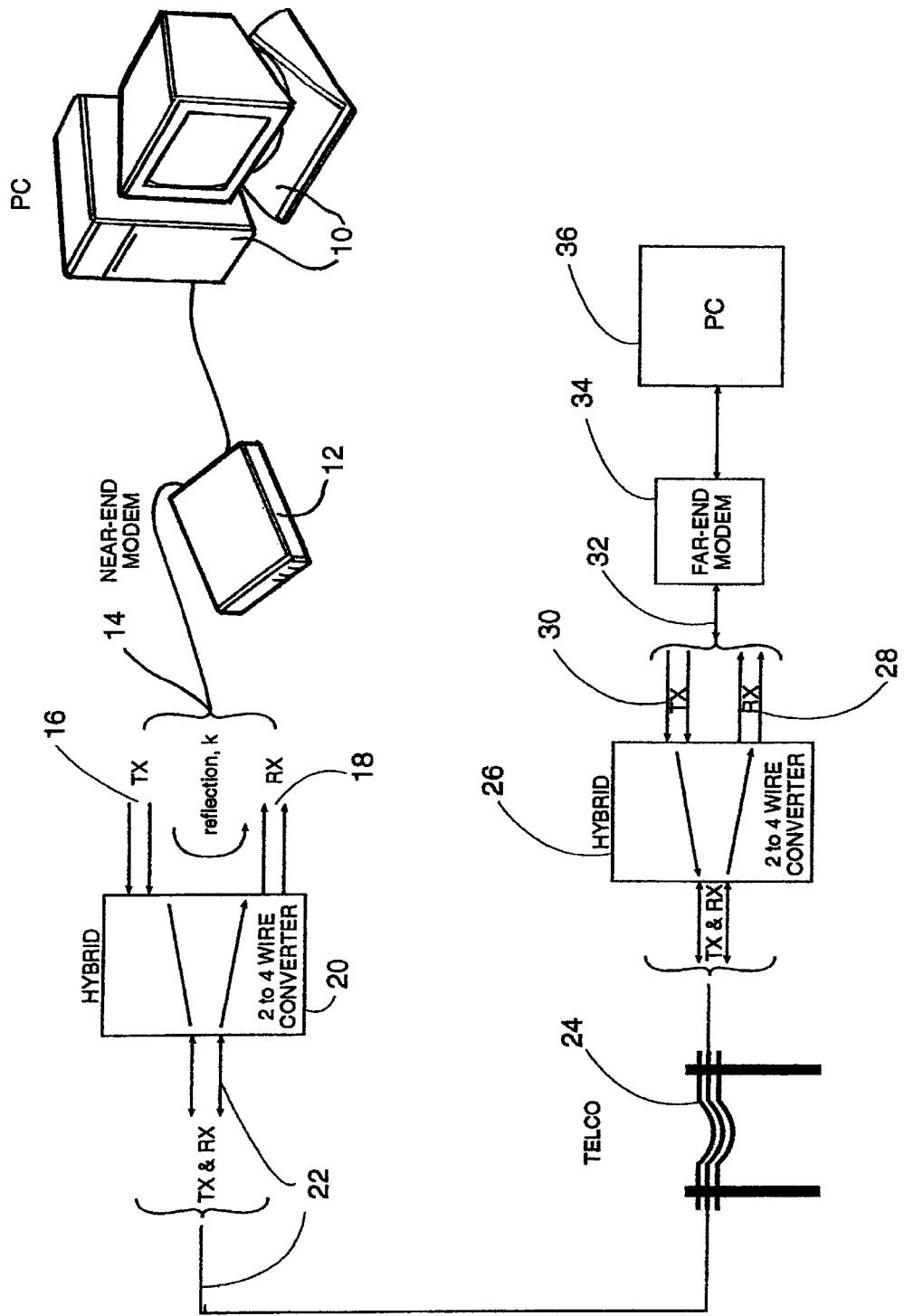
FIG. 1 is a schematic diagram of a prior art system.

Reference now should be made to the drawings, in which the same reference numbers are used throughout the different figures to designate the same or similar components. FIG. 1 is a system diagram of a typical prior art system employing an interconnection between the near end or local telephone station and a far end station without a PBX. This is the type of connection made between homes and many small businesses. As represented in FIG. 1, the near end station is shown as including a personal computer (PC) 10 supplying signals to a modem 12, which for the purposes of the ensuing description may be considered to be what is called a high-speed modem of either 28.8 kbps or 33.6 kbps.

The interconnection between the PC 10 and the modem 12 typically is a very short distance; and the modem 12 then normally is interconnected by way of a four-wire connection 14 to a hybrid circuit 20 (located in the modem 12) operating as a two-to-four wire converter. As illustrated diagrammatically in FIG. 1, the right-hand side of the hybrid 20 has a pair of analog transmission wires 16 and a pair of analog receive (RX) wires 18. These are incorporated as a four-wire connection to and from the modem 12 by way of the cable 14 shown in FIG. 1.

In order to understand the nature of the problem set forth in the background portion of this specification, and the solution to be described subsequently, a brief description of the nature of and operation of the hybrid 20 is considered in order. The connections into and out of the modem 12 to the internal hybrid 20 consist of four wires (two wires 16 for TX and two wires 18 for RX). This four-wire connection, however, does not continue on through the telephone system. The reason is that the cost of twisted copper wire running between the near end station 10/12 and the telephone company, represented at 24 in FIG. 1, can be many miles. Wiring is costly; and in order to keep costs as low as possible, the telephone line 22 uses just two wires (not four) to carry both the TX and RX analog audio. In order to break the two-wire audio back into four wires for utilization by the modem 12, the internal hybrid circuit 20 is employed. This is a two-to-four wire converter (or a four-to-two wire converter) acting as an interface between the two-wire and four-wire portions of the system.

The hybrid circuit 20 is a standard hybrid; and for that reason, details are not shown. An important factor to note, however, is that there always is some amount of reflection (shown in FIG. 1 as reflection, k) between the TX wire set 16 and the RX wire set 18. This reflection is sometimes referred to as a side tone or echo; and it creates an unwanted signal in the form of noise in the RX audio path. This noise interferes with the operation of the modem 12 when the noise reaches that modem. This echo or reflection degrades the modem speed if it is not properly removed. The echo by itself, however, is not the sole cause of the degradation of modem operation. Technically speaking, the amount of reflection indicated as k in FIG. 1 is referred to as trans-hybrid loss or THL.

The amount of reflection k which always occurs at the hybrid interface 20 depends on how well the hybrid 20 matches the impedance of the two-wire analog trunk 22 with the four-wire connection 14 between the modem 12 and the internal hybrid 20. Obviously, the better the match the less reflection k there is. Most hybrids 20 used fixed analog components in the form of resistors, capacitors and transformers to attempt to match the impedance of the phone line 22. These fixed component values are optimized for what is considered a "normal" loop length. The fact that there is a "normal" loop length implies that "long" loops (which are not "normal" loops) will cause more reflection k at the hybrid 20. The more reflection there is, the worse the problem becomes. It is important to note that the reflection k is a form of noise in the RX path; and this noise interferes with the transmitted signal from the far end modem 34 involved at the far end station which is communicating with the near end station including the modem 12.

Completing the system interconnection between a far end station and a near end station in the prior art circuit shown in FIG. 1, the two-wire analog trunk 22 passes through the telephone company system 24 and is supplied to another hybrid 26, which may or may not be identical. On the far end station side of the hybrid 20 are a pair of TX wires 30 and a pair of RX wires 28 comparable to the wire pairs 16 and 18 described previously in conjunction the near end station. This four-wire connection is applied by way of a far end PC 36 or other digital utilization device.

When a full communication loop of the type shown in FIG. 1 is involved, another factor which contributes heavily to the above mentioned problem of modem operation is loop loss. The two-wire analog phone line 22, which connects between the telephone company 24 and the near end and far end modems 34, introduces a loss in the audio in both directions. These losses can vary from a low of about 1 or 2 dB (on a very short loop) to as much as 8 or 9 dB (on a very long loop), depending upon the length of cable. Average loss for most lines is about 3 or 4 dB. This is considered "normal". What this means is that on an end-to-end connection, where both ends have very long lines (8 to 9 dBs), there can be as much as 16 to 18 dB of loss. In the system of FIG. 1, however, this is not a problem.

Figure 2:
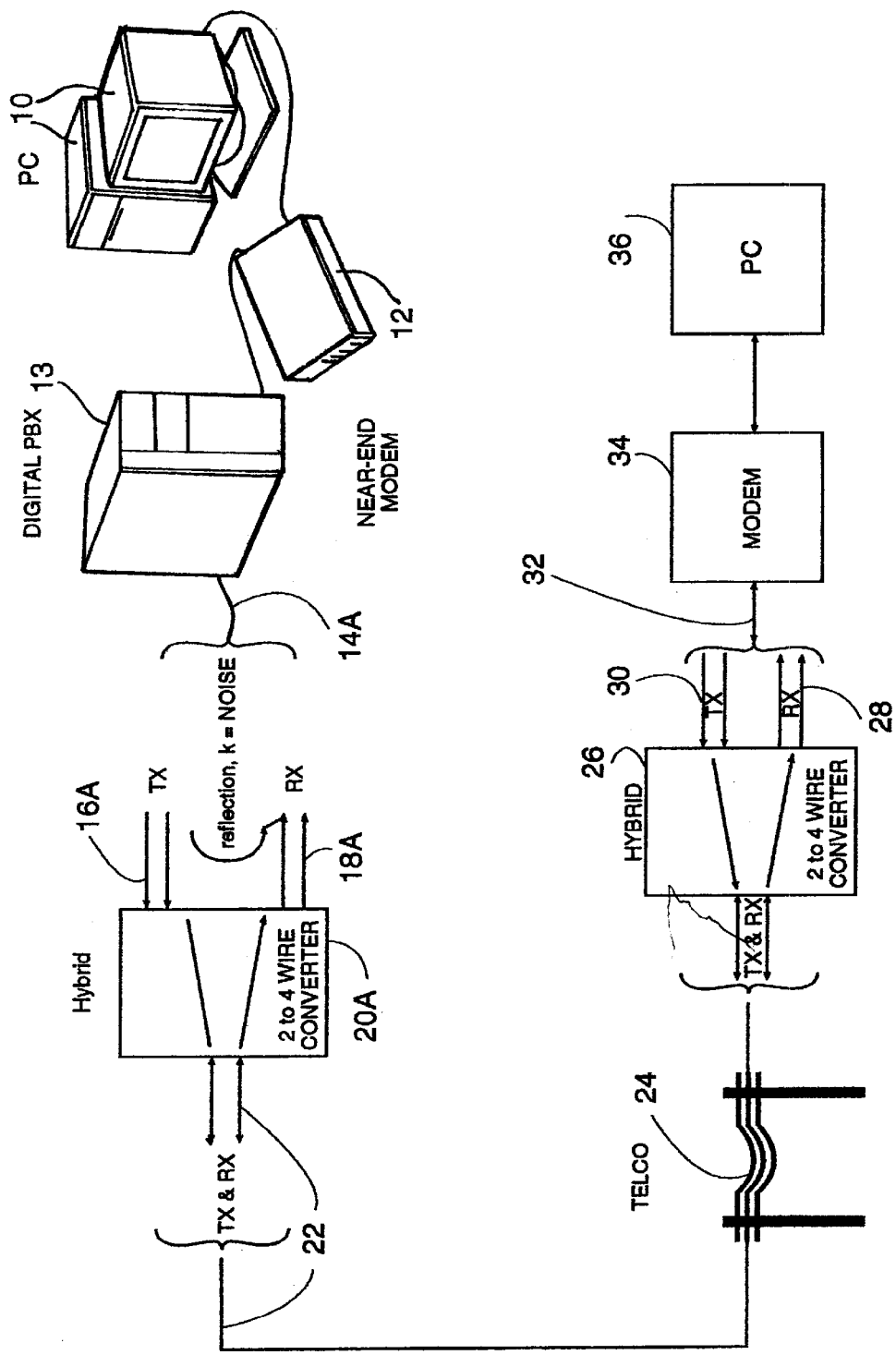
FIG. 2 is a schematic diagram of a variation of the prior art system employing a digital PBX.

Reference now should be made to FIG. 2 which is similar to the system of FIG. 1, but which interconnects a digital PBX 13 between the near end modem 12 (and could also be a far end modem) and the hybrid shown in FIG. 2 as hybrid 20A (internal to the PBX 13) by way of a four-wire connection 14A broken into the TX wires 16A and the RX wires 18A. In conjunction with FIG. 2, assume that the near wire and far wire ends, between the telephone company 24 and the hybrids 20 and 26 both are considered to be very long lines producing 8 to 9 dB of loss. The result of this is that the transmit level from each of the modems 12 and 34 then is approximately 18 dB louder than the received level from the other modem. If an 18 dB end-to-end loss is rounded off to 20 dB, this is a factor of 10. The loss between the near end modem 12 and the PBX 13 is negligible because this distance typically is less than 1000 feet.

With these large loop losses, the operation of the hybrids 20 and 26, with respect to the signal to noise (S/N) ratio of the incoming modem to the far end needs to be considered. As shown in FIG. 2, the near end modem 12 is connected behind a digital PBX 13. By the time the transmit signal from the far end modem 34 reaches the-PBX. 13, the signal level has dropped by nearly 20 dB. The transmit signal from the near modem 12, however, reaches the PBX 13 with close to no loss (0 dB of loss). As a result, the relative signal strength of the two modem signals as they meet at the hybrid circuit 20 in the PBX trunk interface card causes a near end reflection signal k at the hybrid 20A, which is about −6 dB, but the far end modem transmit signal is about −18 dB. This results in an S/N ratio of −12 dB. Basically, this means that the TX signal from the far end modem 34 is much smaller than the echo (noise k) from the near end modem 12.

In conventional systems, the RX signal which is basically the RX plus echo or reflection signal, first must pass through a companding codec (typically $\mu$-law or A-law) as used with conventional digital PBX systems. Thus, the system shown in FIG. 2 has an additional problem created for the RX signal as a result of the companding codec. This, combined with the other factors mentioned in conjunction with the discussion of FIGS. 1 and 2, serves to degrade the performance of the modem 12 significantly below its optimum performance level.

In order to understand an additional contribution to the performance degradation which occurs with a standard digital PBX system of the type shown in FIG. 2, an analysis of the function of a codec is in order. As is well known, the purpose of a codec is to perform analog-to-digital and digital-to-analog conversions. Basically, there are two types of codecs which are employed. These are linear codecs and companding codecs. Typically, a PBX 13 utilizes an internal companding codec for performing this function. This codec is located between the digital PBX 13 and the hybrid converter 20A. Companding codecs are non-linear. The compression scheme used by the telecommunications industry in the United States is referred to as $\mu$-law system (other countries use A-law). The purpose of a companding codec is to reduce or compress the number of bits needed to represent an input voltage without reducing the dynamic range of the input. In the case of a $\mu$-law codec, for example, which has the equivalent dynamic range of a 14-bit linear codec (1 sign bit and 13 magnitude bits), the $\mu$-law codec compresses the value into only 8 bits. Essentially, this is accomplished by means of a logarithmic or non-linear mapping. Small input voltages are converted using small step sizes; but large input voltages get converted using larger step sizes. The ratio of the input voltage to the step size is relatively constant (it does not change by more than a factor of 2). For example, a $\mu$-law codec may assign a step size of 400 $\mu$V for all signals up to 6.4 millivolts. For signals between 6.4 millivolts and 12.2 millivolts, the codec may use a step size of 800 millivolts. For signals between 19.2 millivolts and 44.8 millivolts, the codec may use a step size of 1.6 millivolts, and so on.

Companding codecs work very well for voice, whether the voice signals are loud or quiet. The same codecs even work acceptably well for high speed modem signals as long as the S/N ratio is excellent. Companding codecs, however, do not work well when a low level signal is superimposed on a higher level "noise"; and in the case described above, the "noise" is the echo k from the hybrid 20A. When a low level signal is superimposed on a higher level noise, this results in a very poor S/N ratio. The example shown in FIG. 3 provides an illustration of the effect of using a companding codec when a very poor S/N ratio exists.

Figure 3:
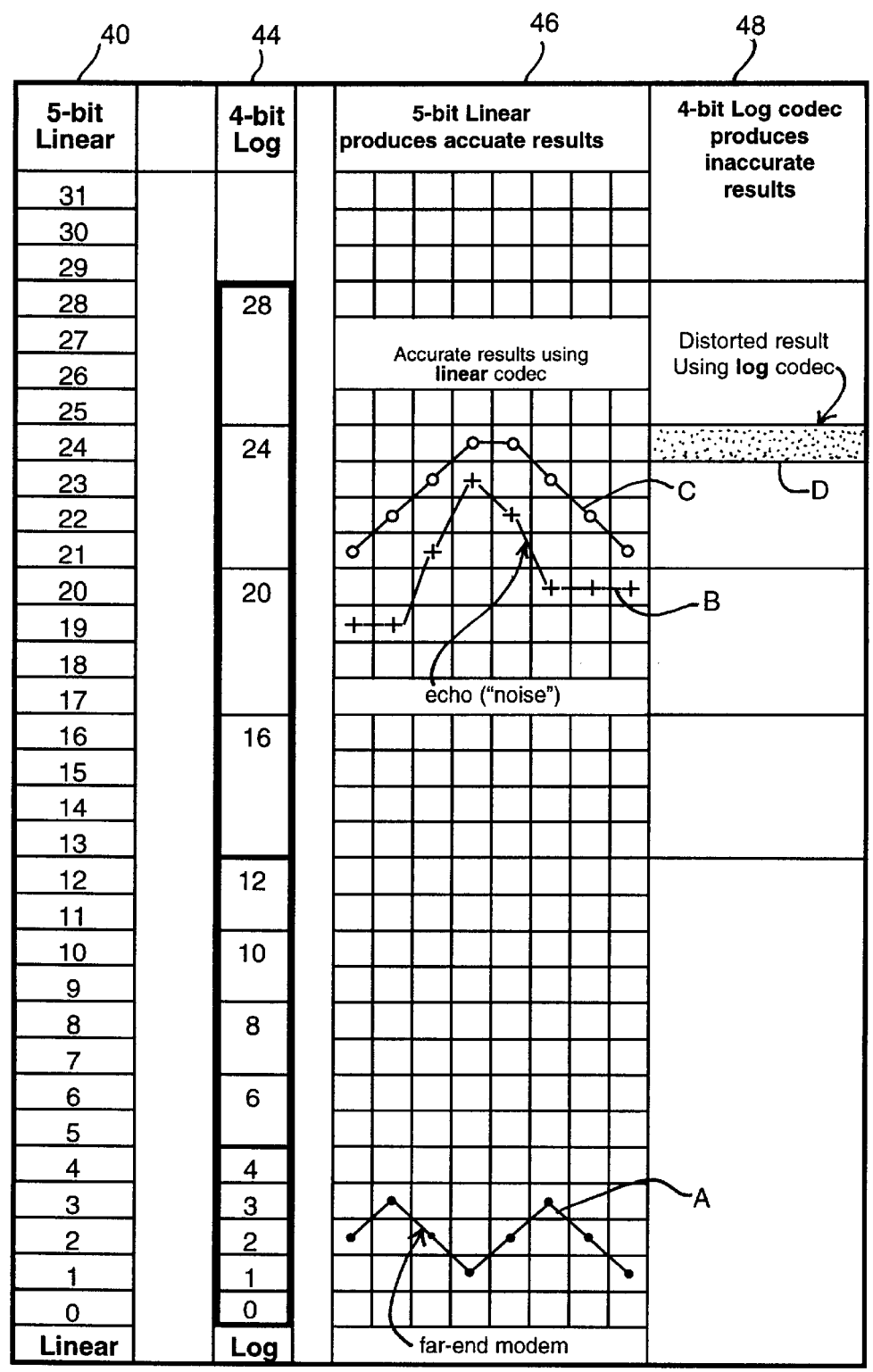
FIG. 3 is a diagrammatic chart used in explaining a preferred embodiment of the invention.

In FIG. 3, for purposes of simplicity, there is shown a comparison between a five bit linear codec 40 (the operation of which is described subsequently) and a four bit log codec or $\mu$-law codec 44. For the purposes of the illustration, assume that a low level transmit signal from the far end modem 34 is being supplied through the hybrid 20A to the near end PBX 13 and modem 12. The low level signal is shown as the waveform "A" at the bottom of the section 46 in FIG. 3. Also assume that the near end modem 13 produces a high level echo or reflection k, as illustrated by waveform "B" in the section 46 of FIG. 3. When these signals are added together at hybrid 20A, they produce a composite signal "C" shown in the upper portion of the center part 46 of FIG. 3.

FIG. 3 also illustrates the difference between a $\mu$-law codec 44 and a linear codec 40. Linear codecs assign equal step sizes for all values of signal. For example, a 16 bit linear codec (1 sign bit and 15 bits to represent the magnitude) will have a range of digital values of 0 to ±32,767. If the codec assigns the value of +32,767 to an input voltage of +3.00 Volts, then the digital to analog correlation is that 1=91.56 microvolts (that is, 91.56 microvolts=3.00 Volts/32,767). Because the codec is linear, it is possible to calculate any digital value by the simple formula: digital value=input voltage/91.56 microvolts.

The result of using a linear codec in contrast to a $\mu$-law codec is clearly shown in FIG. 3. For the purposes of simplification, assume that the linear codec is a five-bit linear codec 40, as shown in FIG. 3. When the two signals, A and B, are added together to form the composite signal C, it is apparent from FIG. 3 that the signal C is accurately produced by the linear codec, since all values are assigned to a different level (21 through 24) of the example shown in FIG. 3. As a consequence, the linear codec allows accurate reproduction of the transmit signal A after the echo canceller of the modem 12 removes the noise signal B.

In contrast, from an examination of the logarithmic compression shown in the section 44 of FIG. 3, all parts of the composite signal "C", for the simplified example of FIG. 3, fall within the same section 24 and are translated into the result "D" shown in section 48 of FIG. 3. This is illustrated as an extreme distortion for the purposes of an overall understanding of the effects of the various components of the system; but clearly the waveform "D" is so badly distorted that it is impossible for an echo canceller in the near end modem 12 to correctly recover the far end modem signal A out of the composite. All values of the composite are translated to the same decoded level.

Figure 4:
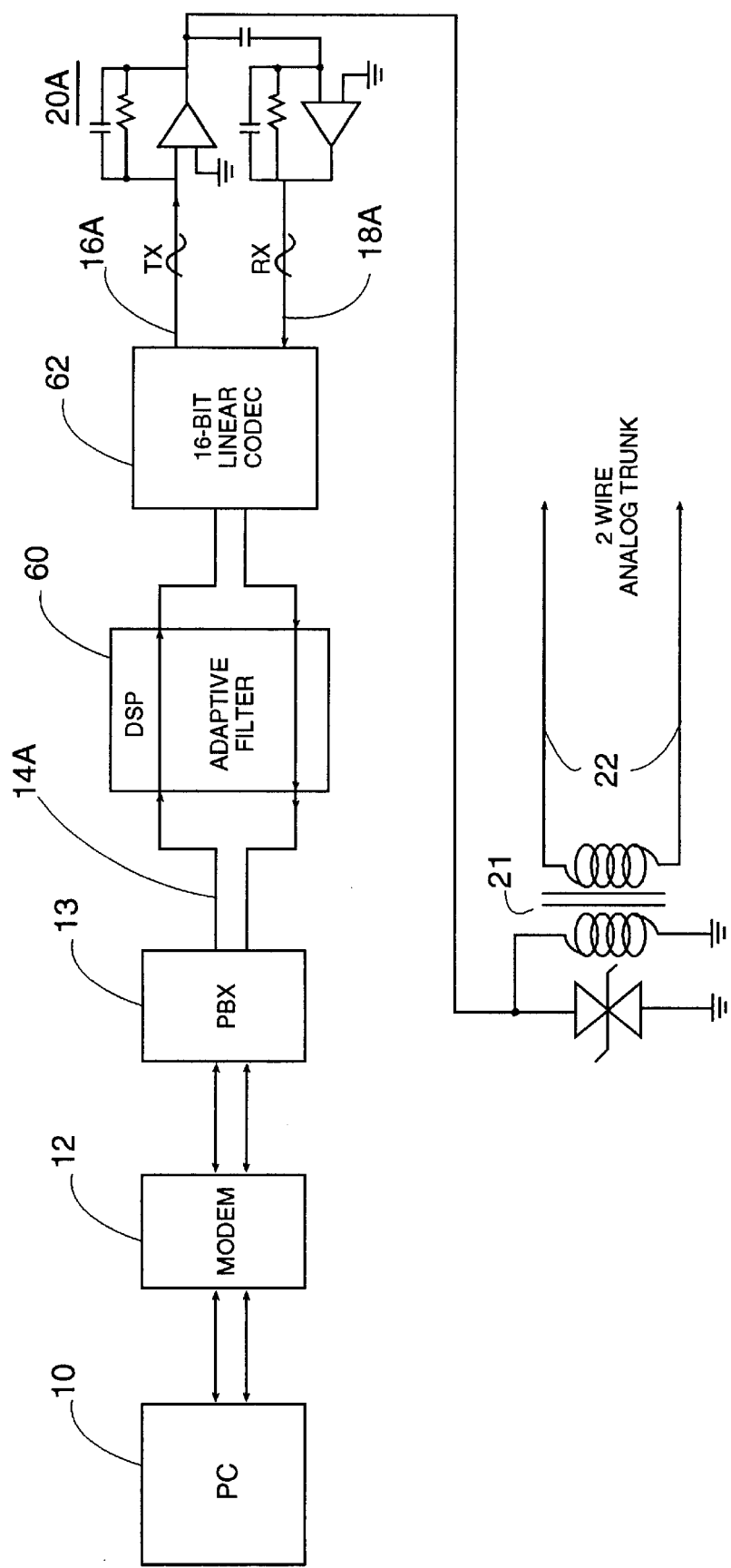
FIG. 4 is a schematic diagram of a modification of the system of FIG. 2 incorporating the features of a preferred embodiment of the invention.

Reference now should be made to FIG. 4, which is a circuit diagram of the near end station portion of a system which is to be substituted for the near end portion of the system shown in FIG. 2. As illustrated in FIG. 4, the PC 10 supplies signals to and from a modem 12 which is connected to a digital PBX 13 in the same manner described above in conjunction with FIG. 2. Inside the PBX 13, between the modem 12 and the internal PBX hybrid 20A, however, two additional components are included. These are a DSP-based echo cancellation circuit 60 employing an adaptive filter connected in series with a linear codec 62 having a minimum 14 bits, but could be 13, 14, 15 or 16 bits. The echo cancellation circuit 60, codec 62 and hybrid 20A all are located on a trunk card inside the PBX 13. The linear codec 62 in turn is coupled with the TX wire pair 16A and the RX wire pair 18A connected to the hybrid 20A. The other side of the hybrid 20A is coupled through a transformer 21 to a two wire analog trunk 22 in the same manner described above in conjunction with FIG. 2.

Even though the circuit of FIG. 4 still requires a hybrid 20A to convert the two-wire analog signal from the two-wire analog trunk to a four-wire audio for the digital conversion, there no longer is any concern about how much echo k is passed by the hybrid 20A. This is because the linear codec 62 accurately encodes very weak far end modem signal summed with the very strong near end modem signal echo k. When the combined signal from the linear codec 62 reaches the echo cancellation filter 60, the filter 60 removes the very strong near end modem echo k and passes on only the signal from the far end modem (such as the modem 34 of FIG. 2) with very little distortion. The result is that the high speed modem 12 is able to communicate at close to its top speed (28.8 or 33.6 kbps) for which it was designed. Although a DSP filter 60 is described, the echo cancellation can be effected by other methods, such as in a gate array.

While the solution shown in FIG. 4 is simple in hindsight, a significant difference in operation is achieved. The substitution of a linear codec for the conventional companding codec, plus the addition of the DSP-based filter 60 in addition to the echo cancellation filter built into the modem 12, overcomes the inherent problem which exists in the original systems.

The above description of the preferred embodiment, taken in conjunction with the drawing, is to be considered illustrative of the invention and not as limiting. Various changes and modifications will occur to those skilled in the art for performing substantially the same function, in substantially the same way, to achieve substantially the same result without departing from the true scope of the invention as defined in the appended claims.

What is claimed is:

1. A system for ensuring optimum performance of a modem used in conjunction with a telephone system employing a digital PBX coupled with a two-wire analog trunk, said system including in combination:
   a digital private branch exchange (PBX) having a four wire audio connection;
   a two-wire analog telephone trunk;
   a hybrid circuit for converting two-wire analog signals on the telephone trunk to four-wire signals for the PBX, and vice versa, the hybrid circuit coupled with the two-wire analog telephone trunk;
   a linear codec; and
   an echo cancellation adaptive filter connected in series circuit with the linear codec,
   wherein a plurality of analog signals is received at the hybrid circuit and passed, in the following order, to the linear codec and the echo cancellation adaptive filter, then to the digital PBX which is coupled to the modem.

2. The system according to claim 1 further including a source of digital signals coupled to the modem for supplying signals to the PBX.

3. The system according to claim 2 wherein the linear codec is thirteen, fourteen, fifteen or sixteen bits.

4. The system according to claim 1 wherein the signals passed to and from the echo cancellation adaptive filter and the linear codec are digital signals and the signals passed between the linear codec and the hybrid circuit are analog signals.

5. The system according to claim 1 wherein the linear codec is thirteen, fourteen, fifteen or sixteen bits.

6. A near end station for receiving and transmitting voice signals over an analog line, the station comprising, in the following order:
   a digital PBX having a trunk card, the card comprising:
      a two-wire analog interface of a hybrid circuit receiving the signals from the analog line, the hybrid circuit converting the signals to four-wire signals thereby introducing a reflection signal;
      a linear codec receiving the four-wire signals and the reflection signal from the hybrid circuit and converting the combined signals to digital representations, and linearly coding the combined signals;
      an echo cancellation circuit filtering the digital signals; and
   a modem coupled to a source of digital signals and to the echo cancellation circuit of the card.

7. The station of claim 6 wherein the echo cancellation circuit comprises a DSP-based filter.

8. The station of claim 6 wherein the echo cancellation circuit comprises a gate array filter.

9. The station of claim 6 wherein the linear codec comprises a 16-bit linear codec.

10. The station of claim 6 wherein the digital PBX comprises a 8-bit PBX.

* * * * *